United States Patent
Solovey et al.

(10) Patent No.: US 11,341,581 B2
(45) Date of Patent: May 24, 2022

(54) SYSTEM AND METHOD FOR REGULAR EXPRESSION GENERATION FOR IMPROVED DATA TRANSFER

(71) Applicant: Digits Financial, Inc., San Francisco, CA (US)

(72) Inventors: Edward Solovey, Brookline, MA (US); Brian Hatfield, Cambridge, MA (US); Jeffrey Hall Seibert, Jr., San Mateo, CA (US); Wayne Chang, North Andover, MA (US)

(73) Assignee: Digits Financial, Inc., San Francisco, CA (US)

( * ) Notice: Subject to any disclaimer, the term of this patent is extended or adjusted under 35 U.S.C. 154(b) by 205 days.

(21) Appl. No.: 16/506,012

(22) Filed: Jul. 9, 2019

(65) Prior Publication Data
US 2021/0012428 A1    Jan. 14, 2021

(51) Int. Cl.
*G06Q 40/00*    (2012.01)
(52) U.S. Cl.
CPC .................................. *G06Q 40/12* (2013.12)
(58) Field of Classification Search
CPC combination set(s) only.
See application file for complete search history.

(56) References Cited

U.S. PATENT DOCUMENTS

| | | | |
|---|---|---|---|
| 4,852,000 A | 7/1989 | Webb et al. | |
| 5,483,445 A | 1/1996 | Pickering | |
| 5,559,313 A | 9/1996 | Claus et al. | |
| 5,787,373 A | 7/1998 | Migues et al. | |
| 5,826,243 A | 10/1998 | Musmanno et al. | |
| 5,842,185 A | 11/1998 | Chancey et al. | |
| 6,032,134 A | 2/2000 | Weissman | |
| 6,792,422 B1 | 9/2004 | Stride et al. | |
| 7,958,164 B2 | 6/2011 | Ivanov et al. | |
| 8,997,091 B1* | 3/2015 | Watson | G06F 8/60 717/175 |
| 9,576,282 B2 | 2/2017 | Murphy et al. | |
| 9,760,551 B2 | 9/2017 | Luo et al. | |
| 9,817,875 B2 | 11/2017 | Hernandez et al. | |
| 2005/0197954 A1 | 9/2005 | Maitland et al. | |
| 2009/0319404 A1 | 12/2009 | Duchamp | |
| 2011/0078042 A1 | 3/2011 | Fletcher | |
| 2018/0314835 A1* | 11/2018 | Dodson | H04L 63/1425 |
| 2019/0205872 A1* | 7/2019 | Tourne | G06F 16/219 |

FOREIGN PATENT DOCUMENTS

WO    WO-2000030006 A1    5/2000

OTHER PUBLICATIONS

Bartoli et al., Automatic Generation of Regular Expressions from Examples with Genetic Programing, pp. 1477-1478, GECCO'12 Companion, Jul. 7-11, 2012.
European Search Report dated Jun. 3, 2020 for European Patent Application No. 20 162 023.4 filed Mar. 3, 2020 for Digits Financial Inc., 11 pages.

* cited by examiner

*Primary Examiner* — Aryan E Weisenfeld
*Assistant Examiner* — Reva R Moore
(74) *Attorney, Agent, or Firm* — Cesari and McKenna, LLP

(57) ABSTRACT

A system and method for generating regular expressions to identify vendors to enable improved financial data transfer from a first computer system to a second computer system is provided.

10 Claims, 8 Drawing Sheets

SYSTEM AND METHOD FOR REGULAR EXPRESSION GENERATION FOR IMPROVED DATA TRANSFER

BACKGROUND

There exists a plurality of differing financial reporting systems that may be utilized by an enterprise for managerial or other purposes. Examples of such systems include the Quickbooks® suite of software. Such software typically enables a user to enter financial transactions and to classify each transaction as affecting one or more categories identified in a predefined chart of accounts. Earlier systems typically required manual entry of all of the financial data; however, more modern systems may retrieve raw financial data from one or more financial service providers, such as banks, credit card companies, etc.

A noted disadvantage of current systems is that the incoming raw financial data received from various financial service providers may not contain sufficient information to identify a particular transaction, particularly the vendor associated with a transaction, in an automated manner. Typically, a financial services company, such as a credit card servicer, may provide electronic information relating to the transaction. However, the information provided includes a text field that is not arranged in any standard format. This unstructured format reduces the ability to perform automated data transfer from a financial services company into an electronic financial reporting system. Effectively, the data may be transferred from the financial services company to the financial reporting system, but then requires human intervention to properly classify or label the financial data. This significantly reduces throughput and causes the financial reporting system to be idle while waiting for humans to classify the financial data.

More generally, when transferring data from a first computer system to a second computer system, if portions (or all of) the data associated with a particular transaction or entry do not have a well-defined format or structure, the computer systems may not be able to effectively transfer the data from a first format to the second format. While this is commonly seen in relation to financial data, this noted disadvantage arises in other data communication/transfer environments. Thus, there is a noted disadvantage of computer systems that are trying to communicate using non-structured data formats. The present invention enables automated association of a regular expression identifying transaction or other data entries with a source identifier, e.g., a vendor.

SUMMARY

The noted disadvantages of the prior art relating to the communication between a first computer system and a second computer system using data that is not in a highly structured format are overcome by the novel system and method for improved regular expression generation described herein. The second computer system generates a mapping data structure (vendor map) utilized to associate particular regular expressions with a particular vendor. Historical data, that illustratively includes such mappings, is input into the second computer system, which then clusters the data. Each cluster is then converted into regular expressions.

The converted regular expressions are then analyzed to determine if they clash with previously generated regular expressions, i.e., a single transaction data set would match two or more regular expressions. If there are clashes, the clustering threshold is updated and new clusters are created. If there are no clashes, the tokens within the regular expressions are evaluated for uniqueness to determine whether they are sufficiently unique.

In operation, new input data, such as a new financial transaction, is received at the second computer from the first computer. The second computer applies the previously generated regular expressions to determine if the new input data matches one of the regular expressions. If it does match, the system associates the new input data with the entity, such as a vendor, that is associated with the matching regular expression. The input data may then be appropriately flagged or otherwise categorized based on the entity.

By automatically associating the input transaction with the vendor according to the one or more embodiments described herein, human intervention is not required to properly classify or label the input transaction. Advantageously throughput at the financial reporting system is increased. Therefore, the one or more embodiments described herein provide an improvement in the existing technological field associated with financial reporting systems since an input transaction received at the financial reporting system may be automatically and systematically associated with a vendor.

In addition, the one or more embodiments described herein have a practical application since financial reporting system may not have to rely on human intervention and the input transaction may be automatically and systematically associated with a vendor.

BRIEF DESCRIPTION OF THE DRAWINGS

The above and further advantages of illustrative embodiments of the present invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
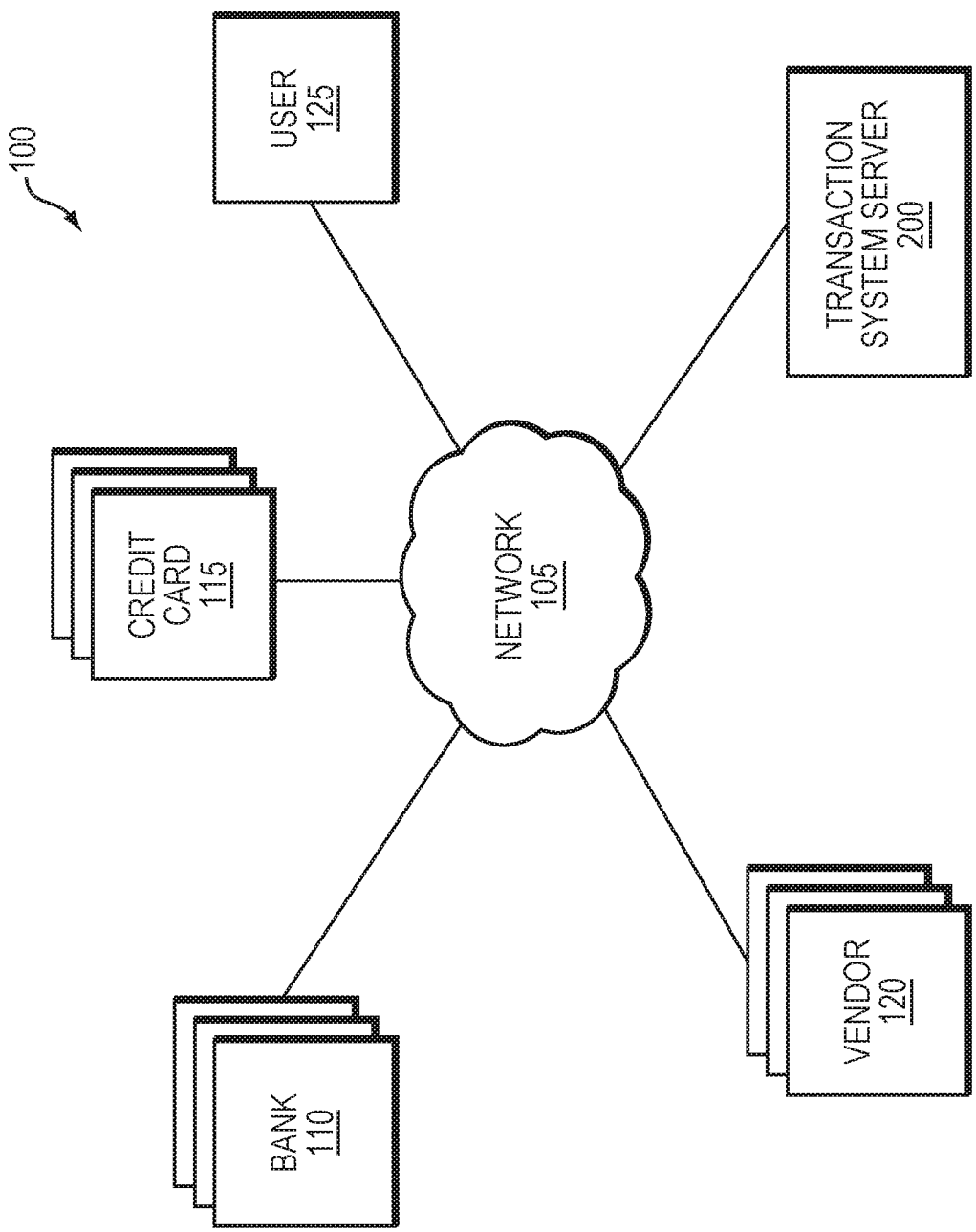
FIG. 1 is a schematic diagram of an exemplary network environment in accordance with an illustrative embodiment of the present invention.

FIG. 1 is a schematic diagram of an exemplary network environment 100 in which the principles of the present invention may be implemented in accordance with an illustrative embodiment of the present invention. The environment 100 is exemplary centered on a network 105. In one exemplary embodiment, the network 105 comprises the well-known Internet. However, it should be noted that, in alternative embodiments, network 105 may comprise one or more networks that may or may not be interconnected. As such, the description of a single network 105 should be taken as exemplary only. It is expressly contemplated that the network 105 may comprise a series of interconnecting networks to enable data to flow among any of the elements that are operatively interconnected. For example, a local area network (LAN) may be directly connected to the user computer 125. That LAN may then be interconnected with a wide area network (WAN), such as the Internet, to be operatively interconnected with other elements of the network environment 100. Further, it should be noted that network 105 may be wired and/or wireless in various portions.

Figure 2:
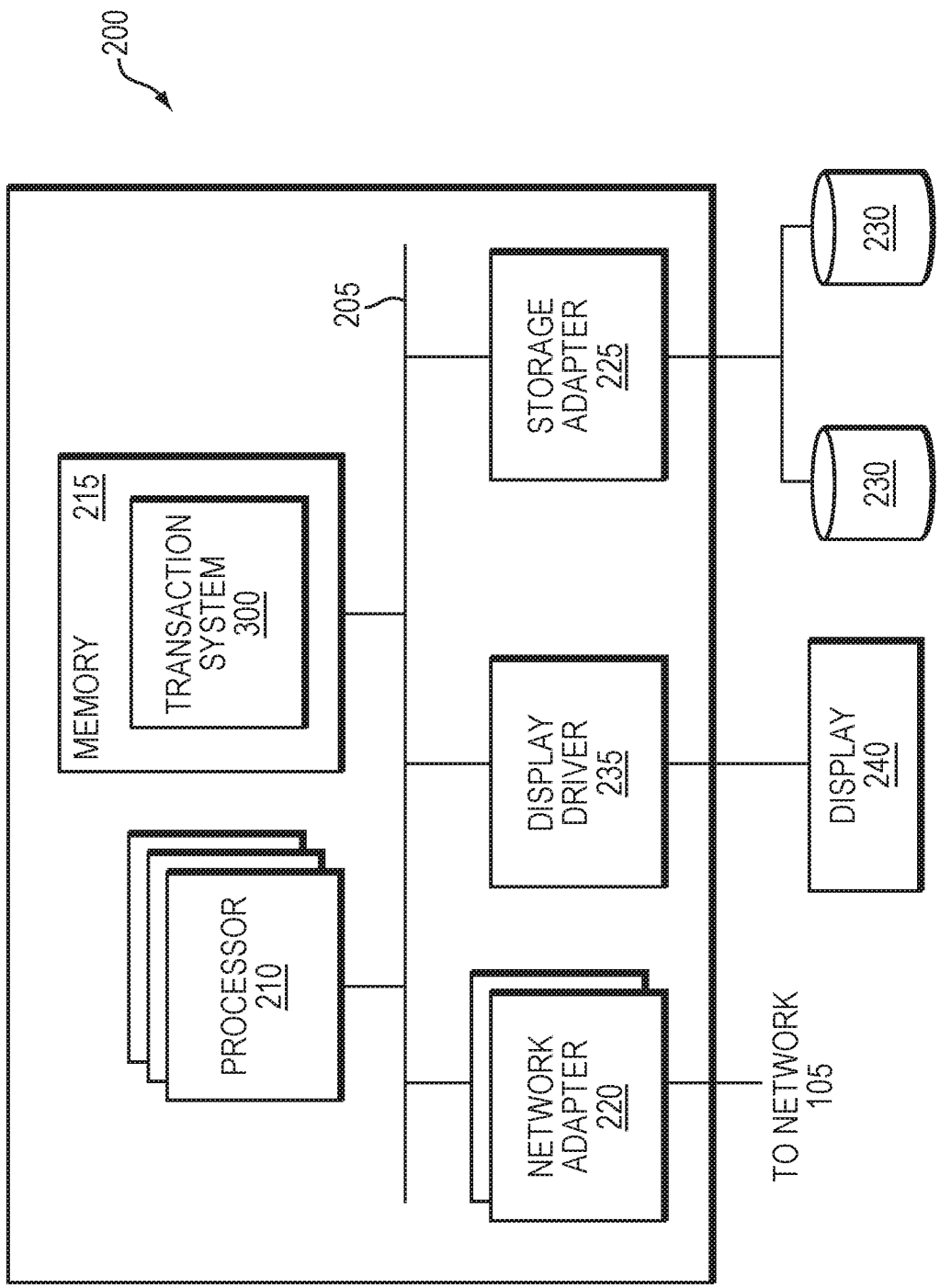
FIG. 2 is a schematic block diagram of an exemplary transaction server in accordance with an illustrative embodiment of the present invention.

A financial transaction server 200, described in further detail below in relation to FIG. 2, is operatively interconnected with the network 105. The financial transaction server 200 executes software to provide a financial reporting system to one or more enterprises. In operation, the financial reporting system gathers various financial data from the other systems connected to network 105 and provides financial reporting and analysis to users of the system. The financial transaction server 200 may support a plurality of differing enterprises at once. That is, the transaction management server 200 may support users at enterprise A (a software company) and at enterprise B (a law firm). As will be detailed further below, the aggregation of data across a plurality of clients of the financial transaction server 200 may enable improved processing of the financial transaction server.

Operatively interconnected to network 105 are a plurality of bank servers 110. It should be noted that while the term bank is utilized in relation to bank servers 110, other financial services companies may also be interconnected in accordance with the principles of the present invention. Therefore, it is expressly contemplated that the term bank should be taken to be encompass more generally any other financial service providers such as, inter alia, brokerage firms, credit unions, alternative financial providers, such as PayPal, etc. In accordance with an illustrative embodiment of the present invention, the bank servers 110 provide, via the network 105, financial transaction information to financial transaction server 200, as described further below.

Also operatively interconnected with the network 105 are one or more credit card servers 115. Similar to bank servers 110, credit card servers 115 provide credit card transaction information to the financial transaction server 200 in accordance with an illustrative embodiment of the present invention. Such information may identify a date that a transaction was processed, a payee, a dollar amount, a type of transaction or category of transaction, an unformatted text field, etc. Again, similar to bank servers 110, credit card servers 115 may provide such information in either a batch process or in substantially real time. It should be further noted that while the term credit card is being referred to as used herein, it is expressly contemplated that charge cards, pre-paid cards, and the like are expressly contemplated in alternative embodiments. Therefore, the use of the term credit card should be taken as exemplary only.

One or more vendor servers 120 may also be interconnected with the network 105. The vendor servers 120 may be associated with particular vendors of the enterprise. As used herein, a vendor may comprise an organization or entity that provides goods and/or services to the enterprise and which receives payment from the enterprise. For example, a vendor may be a ride sharing company that is utilized by employees of the enterprise when traveling for business. Similarly, a vendor may comprise a company that provides goods, such as an office supply company. In accordance with an illustrative embodiment of the present invention, vendor servers 120 may provide detailed information about particular transactions to the financial transaction server 200. Such information may include, for example, a transaction identifier, a listing of goods or services provided, a total cost, and, in alternative embodiments, additional information relating to the transaction.

One or more user computers 125 are also operatively interconnected with the network 105. Illustratively, the user computer 125 may be a computer executing web-based access software (not shown) to enable a user to communicate with the financial transaction server 200, described further below in reference to FIG. 2. More generally, a user computer may be implemented as a smartphone, tablet, laptop, desktop or other computing device that is capable of interfacing with financial transaction server 200. In operation, typically there will be a plurality of user computers interacting with the server. For example, a chief financial officer may be utilizing his or her computer to access the server 200, while a department head may be using his to access transaction information relating to a particular department. Therefore, while a single user computer 125 is shown, it is expressly contemplated that a plurality of user computers 125 may be utilized in accordance with an illustrative embodiment of the present invention. Further, the form and type of the user computer may vary. Therefore, the term user computer should be interpreted broadly to encompass any such device enabling interaction with the server.

FIG. 2 is a schematic block diagram of a financial transaction server 200 that illustratively comprises one or more processors 210, a memory 215, a network adapter 220, a display driver 235, and a storage adapter 225 interconnected by a system bus 205. It should be noted that certain components are shown and described herein, but that the principles of the present invention may be utilized in computing environments having differing configurations as long as similar functionality is obtained.

The memory illustratively comprises storage locations that are addressable by the processor 210 and adapters for storing software program code and data structures associated with the present invention. The processor and adapters may, in turn, comprise processing elements and/or logic circuitry configured to execute the software code and manipulate the data structures.

One or more processors 210 provide the processing power to the server. In accordance with various alternative embodiments of the present invention, there may be one or more processors, each having one or more cores. Further, it should be expressly noted that while the server 200 is shown as a single entity, in alternative embodiments the functionality may be divided among a plurality of computing devices. Therefore, the description of a singular server 200 should be taken as exemplary only. The memory 215 may be utilized to store program code, software and/or data structures for operation by the processor.

The memory 215 stores an operating system (not shown) and executes the transaction management software 300, described below in reference to FIG. 3. It should be noted that in alternative embodiments various operating systems may be utilized and, in embodiments wherein the server is executing over a plurality of computing devices, each computing device is not required to execute the same operating system.

The network adapter comprises a plurality of ports adapted to couple the server to one or more entities over a network 105. The network adapter thus may comprise mechanical, electrical and signaling circuitry needed to connect the system to the network 105. Illustratively, a plurality of network adapters may be utilized depending on the required bandwidth between the server 200 and network 105. Further, it is expressly contemplated that various network adapters may vary in connectivity type. For example, a first network adapter may be a conventional Ethernet adapter connecting the server 200 to the Internet. However, it is expressly contemplated that a second network adapter 220 may be a wireless network adapter enabling user computers that are in close vicinity to the server to access it without transmitting over a wired network. As will be appreciated by those skilled in the art, a variety of network adapters and configurations are possible to meet the needs of an enterprise's network security, bandwidth, and geographic distribution. Therefore, the description of a network adapter 220 should be taken as exemplary and be interpreted broadly.

The storage adapter cooperates with the server to access information requested on storage devices 230. Information may be stored in a type of attached array of writable storage device media such as, for example video tape, optical, DVD, magnetic tape, bubble memory, electronic random access memory, disk drives, flash drives, or any other similar media adapted to store information. As illustratively described herein, the information is stored on storage devices, such as disks 230. The storage adapter comprises a plurality of ports having input/output interface circuitry that couples to the disks 230. It should be noted that in alternative embodiments, a plurality of different types of storage devices 230 may be utilized for a single server. For example, some data may be stored on a solid-state storage device, whereas other data is stored on magnetic media. Therefore, the description of discs as storage devices should be taken as exemplary only.

Display driver 235 provides output information to a display 240. In accordance with an illustrative embodiment of the present invention, a display 240, such as a conventional computer monitor, may be provided for displaying information from software 300, etc. However, in alternative embodiments of the present invention such information is transmitted over network 105 to a user's computer 125 to be displayed at the user computer.

Figure 3:
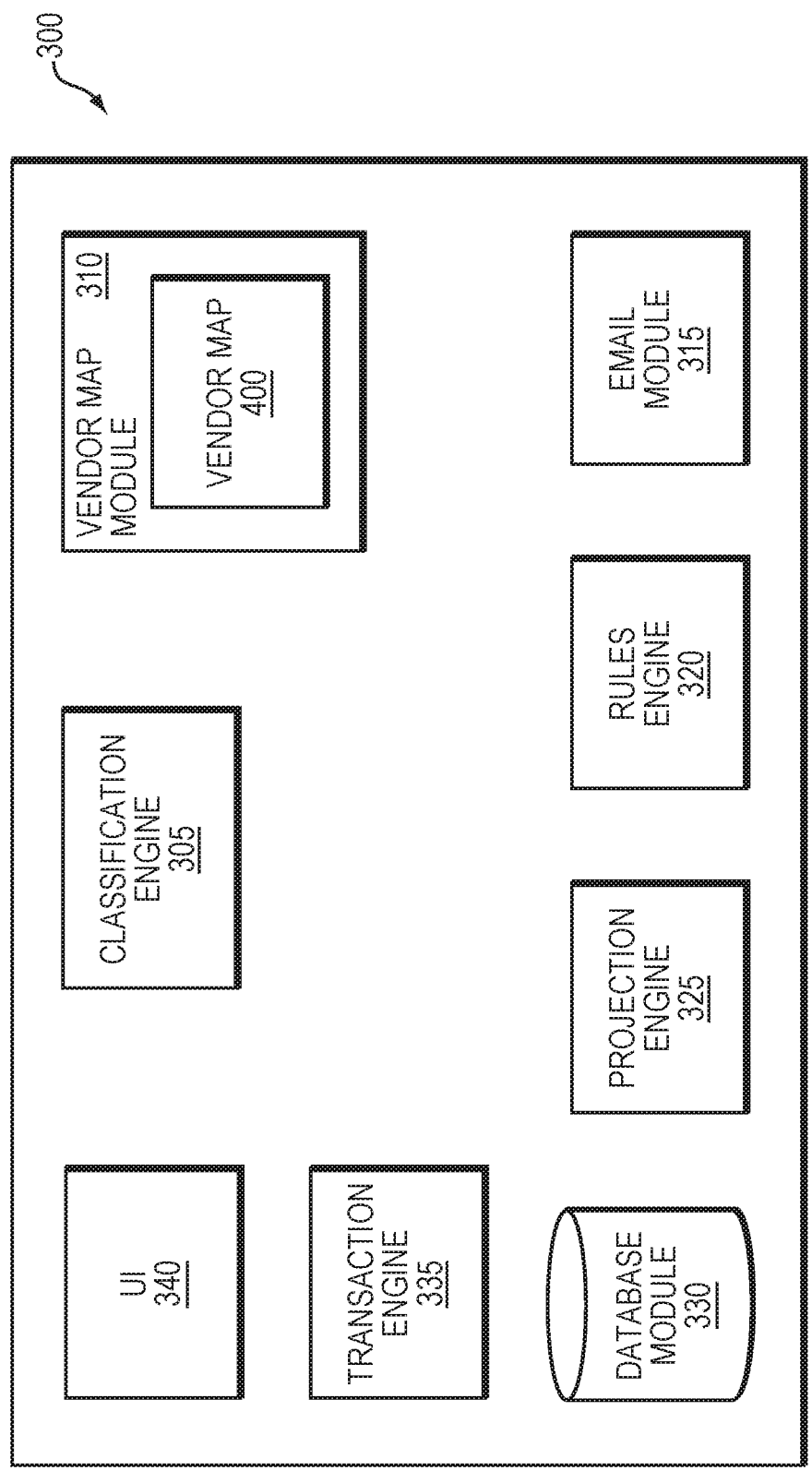
FIG. 3 is a block diagram of exemplary transaction management software in accordance with an illustrative embodiment of the present invention.

FIG. 3 is a diagram illustrating exemplary modules of the transaction management software 300 in accordance with an illustrative embodiment of the present invention. It should be noted that while the various components may be referred to as modules, it is expressly contemplated that differing software arrangements may be utilized in accordance with alternative embodiments of the present invention. Therefore, the use of the term module should be taken as exemplary only.

Illustratively, the transaction management software implements a financial reporting and modeling system that aggregates data from various financial service providers and provides modeling capabilities. In an illustrative embodiment, the software provides conventional accounting and reporting functionality. However, in alternative embodiments, the software may rely on other software, such as Quickbooks, to provide the basic accounting functionality.

The system 300 illustratively comprises a classification engine 305, a vendor map module 310, an e-mail module 315, a rules engine 320, a projection engine 325, a database module 330, a transaction engine 335, and a user interface module 340. It should be noted that in accordance with alternative embodiments of the present invention and various other and/or differing modules may be implemented. Further, the functionality described herein in relation to each of the various modules may be merged and/or rearranged in alternative embodiments. As such, the description of the functionality being performed by specific module should be taken as exemplary only.

The classification engine 305 operates to retrieve classify each transaction by assigning it to one or more categories for use by the system. For example, a credit card transaction is analyzed and identified as being associated with a particular vendor. The classification engine 305 may utilize the vendor map module 310 to identify the category or categories into which the transaction should be associated.

The vendor map module 310 contains a vendor map 400, described below in relation to FIG. 4, that provides associations between particular vendors and categories in accordance with illustrative embodiment of the present invention.

The e-mail module 315 illustratively analyzes a user's e-mail to identify e-mails from vendors. E-mails from vendors may be analyzed to identify details associated with a particular transaction. For example, a user may purchase an item from an online vendor. The classification engine may receive the financial transaction from, for example, a credit card server. However, without further information, the granularity of data is limited to the fact that a transaction for a particular amount with a particular vendor has occurred. The e-mail module may, in the illustrative embodiments, skim a user's e-mail to identify an e-mailed receipt that may be matched with a particular financial transaction to enable the specific goods or services that were purchased to be input into the system.

A rules engine 320 manages the overall system to ensure that transaction information is updated in accordance with a user defined preference.

The projection engine 325 illustratively manages financial projections in accordance with illustrative embodiment of the present invention. In one exemplary embodiment, a user may define a projection based on a given set of assumptions.

A database module 330 tracks and manages the various data structures utilized by the software 300. It should be noted that while it is identified as a database module, in accordance with exemplary embodiments of the present invention, there are other types of data structures may be utilized. Therefore, the term database should be taken as exemplary only.

The transaction engine 335 manages the input of various financial transactions into the software 300.

The user interface module 340 illustratively provides a web based user interface to the software. In accordance with alternative embodiments of the present invention, the UI may provide a localized display. Therefore, the description of the user interface being web-based should be taken as exemplary only.

Figure 4:
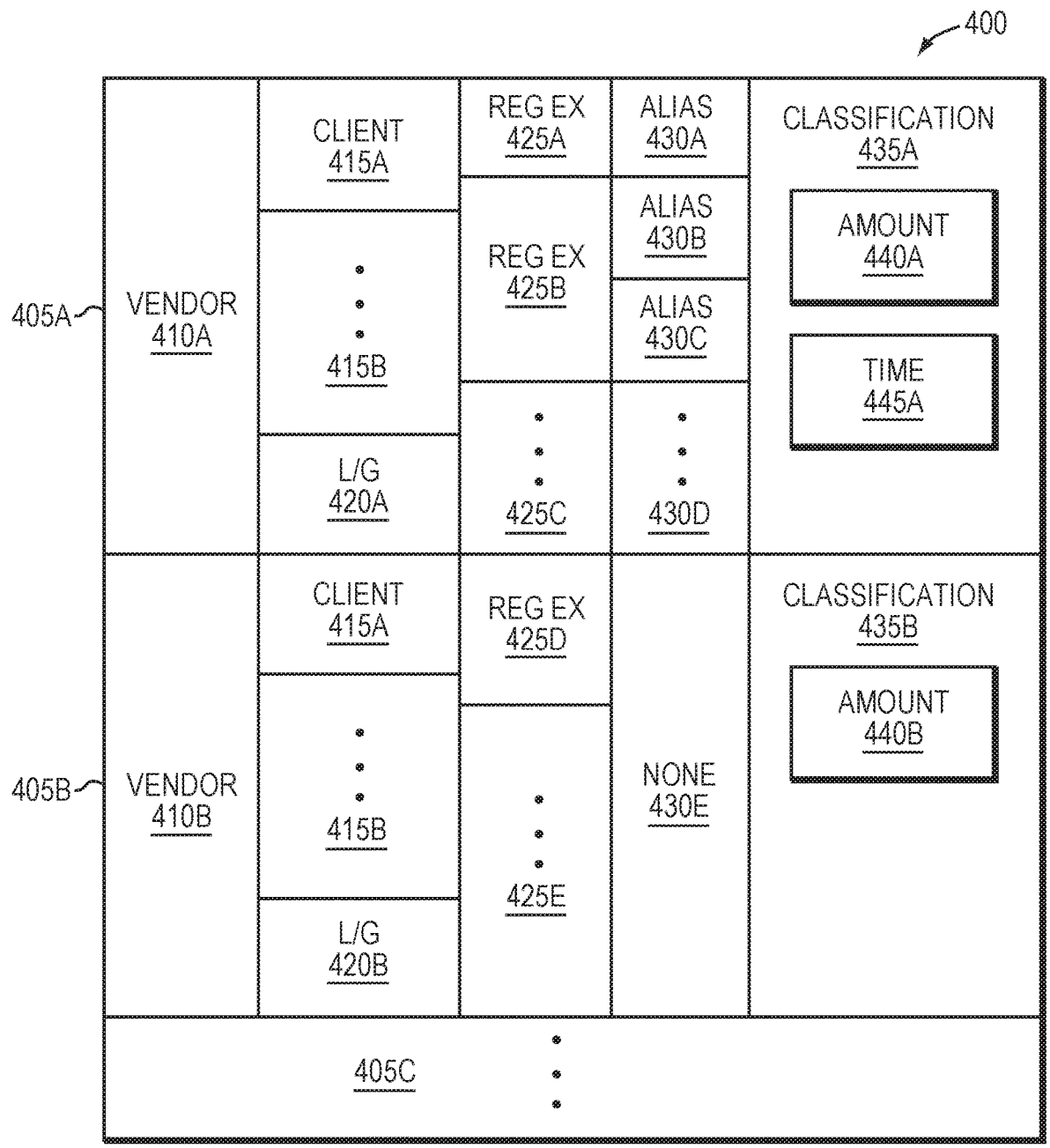
FIG. 4 is a diagram of an exemplary vendor map data structure in accordance with an illustrative embodiment of the present invention.

FIG. 4 is a diagram of an exemplary vendor map data structure 400 in accordance with an illustrative embodiment the present invention. It should be noted that while the vendor map data structure 400 is described herein with a particular format, in accordance with alternative embodiments of the present invention, the vendor map data structure 400 may be implemented using other configurations. As such, the description contained herein of a particular data structure format should be taken as exemplary only. It should be noted that in alternative embodiments, a plurality of data structures may be utilized to store the various information described herein.

The vendor map data structure 400 includes a plurality of entries 405A, B., C., each of which is associated with a particular vendor. Each entry 405 contains a vendor identification field 410. The vendor identification field 410 may contain the name of the vendor, contact information, a unique vendor ID, or other information utilized by the transaction system to identify a particular vendor.

Further associated with each entry 405 is a client field 415. Illustratively, the client field 415 contains identifiers for each client that is associated with the transaction system and that utilizes a particular vendor. The local/global flag 420 is utilized by the system to determine whether or not a particular entry 405 and the associated regular expressions are local or global, as described further below. A set of regular expressions 425 that are associated with a particular vendor are stored. The regular expressions are utilized by the transaction management system as described further below to convert incoming data from a financial service provider for identification and classification purposes. The use of the regular expressions in accordance with illustrative embodiments of the present invention enable improved processing by the automated financial transaction systems by reducing the need for manual intervention and enabling automated data transfer between a financial service provider and the automated accounting system.

Entry 405 may include one or more alias fields 430. Alias fields 430 may be utilized to store particular aliases associated with a vendor. These may be the variations of a vendor's name, such as "Amazon.com" versus "Amazon, Inc". The alias fields 430 enable the transaction management system to correctly identify a particular vendor even if transaction information received from a financial services company utilizes a variation of the vendor's name.

A classification field 435 is utilized to store information relating to how to classify transactions from a particular vendor in accordance with illustrative embodiments of the present invention. Illustratively, this classification information may include amount classification information 440 and/or time classification information 445. As can be seen in exemplary data structure 400, entry 405A includes both amount 440 and time 445 information, while entry 405B only includes amount information 440 B.

Figure 5:
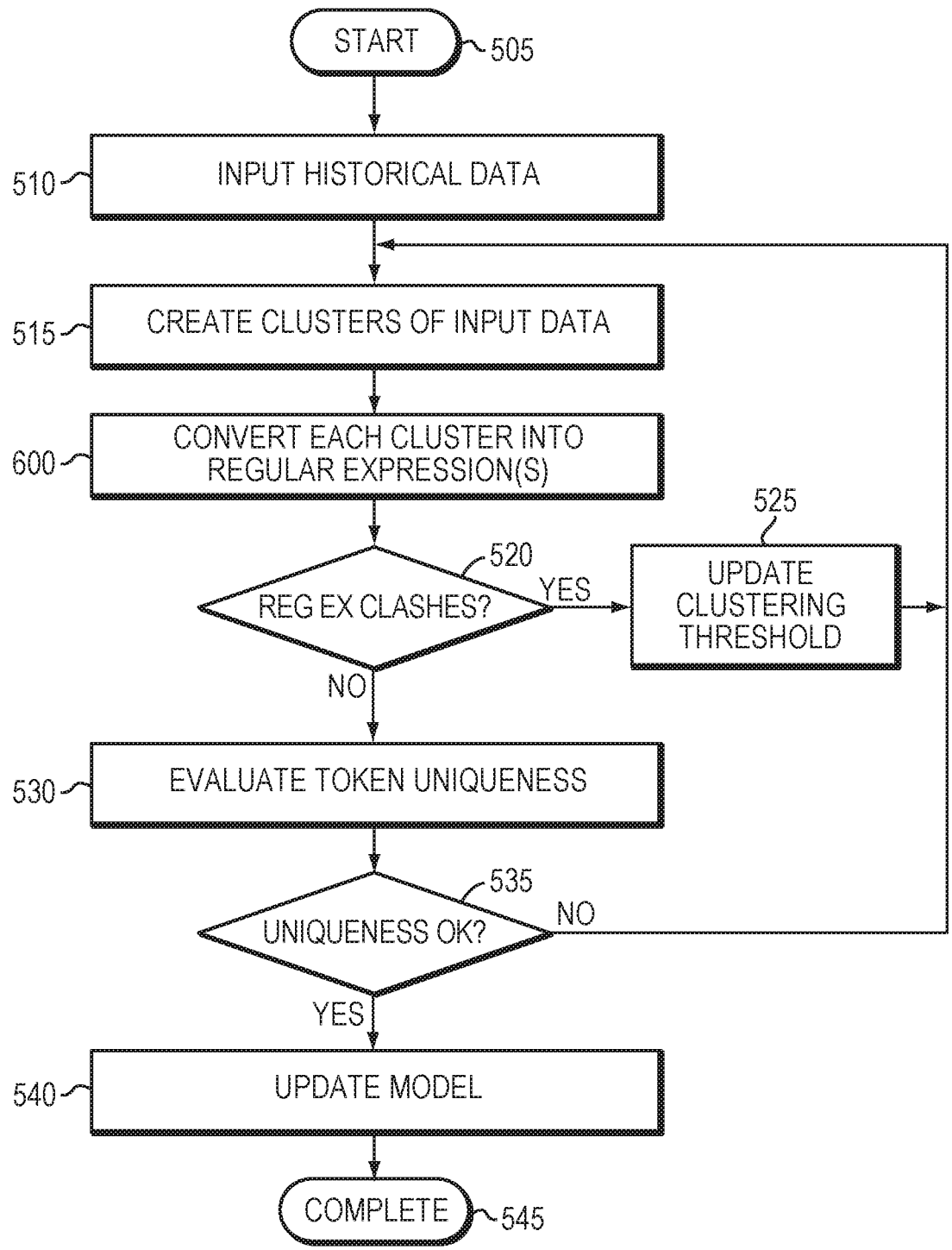
FIG. 5 is a flowchart detailing the steps of a procedure for generating regular expressions for classification of transaction information in accordance with an illustrative embodiment of the present invention.

FIG. 5 is a flowchart detailing the steps of a procedure 500 for generating regular expressions in accordance with illustrative embodiment of the present invention. The procedure 500 begins in step 505 and continues to step 510 where historical data is input. This step is utilized to obtain the raw data necessary to generate the regular expressions for improved data transfer in accordance with an illustrative embodiment of the present invention. Illustratively, the historical data has been pre-categorized by hand while a particular user was utilizing a previous accounting/financial software package. As each transaction is identified with a particular vendor, the present invention may utilize this a priori knowledge to generate the regular expressions to enable improved operation of a financial system.

As noted above, each transaction that is imported into the transaction management system contains a not highly structured text description field. Illustratively, there is no set standard format for the contents of this free-form text field. That is, each vendor may include any desired information within that field. Further, vendors may vary the information contained within the free-form text field. The fields associated with the transaction may be an amount of, currency identifier, etc. These fields associate with input transaction are more well-defined and do not need to be analyzed like the text description field. Illustratively, the models that are generated by transaction modeling system are generated on a per customer level.

The procedure then moves to step 515 where clusters of the imported data are created. An exemplary entity that is being used to obtain financial transaction data is a local bank with which a particular customer has a banking relationship. Six exemplary transactions are illustrated below:
 INTERNAL TRANSFER INT TRANSFER FROM 1234
 INTERNAL TRANSFER INT TRANSFER FROM 5678
 AUTOMATIC PAYMENT—THANK YOU
 AUTOMATIC PAYMENT—THANK YOU
 ZERO BAL TRF DEBIT INT TRANSFER TO 9001
 ZERO BAL TRF DEBIT INT TRANSFER TO 9002

To a human, it is readily apparent that these transactions may be grouped into three different sets. However, automating this clustering may be difficult. In accordance with an illustrative embodiment, the system utilizes the Levenshtein Distance to generate clusters. In a typical scenario where more clusters are desired, the six illustrative transactions may be arranged into three clusters as such:
CLUSTER 1:
 INTERNAL TRANSFER INT TRANSFER FROM 1234
 INTERNAL TRANSFER INT TRANSFER FROM 5678
CLUSTER 2:
 AUTOMATIC PAYMENT—THANK YOU
 AUTOMATIC PAYMENT—THANK YOU
CLUSTER 3:
 ZERO BAL TRF DEBIT INT TRANSFER TO 9001
 ZERO BAL TRF DEBIT INT TRANSFER TO 9002

However, should be clustering threshold be set so that fewer distinct clusters are generated, the same six transactions may be clustered as such:
CLUSTER 1:
 INTERNAL TRANSFER INT TRANSFER FROM 1234
 INTERNAL TRANSFER INT TRANSFER FROM 5678
 ZERO BAL TRF DEBIT INT TRANSFER TO 9001
 ZERO BAL TRF DEBIT INT TRANSFER TO 9002
CLUSTER 2:
 AUTOMATIC PAYMENT—THANK YOU
 AUTOMATIC PAYMENT—THANK YOU As will be appreciated by those skilled in the art, the Levenshtein Distance includes a similarity threshold that may vary between 0-100. A threshold value of 0 causes a single cluster to be generated, while a value of 100 requires strings to be identical in order to be placed into a same cluster. In accordance with an illustrative embodiment of the present invention, the similarity threshold is initially set at a value between 75-85, and later adjusted by the software as needed and as described herein. In accordance with alternative embodiments, other clustering techniques may be utilized that offer user defined variables to adjust the number of clusters.

Each cluster is then converted into one or more regular expressions in step 600 as is further described below in relation to FIG. 6. It should be noted that in accordance with alternative embodiments of the present invention, techniques other than that disclosed in relation to FIG. 6 may be utilized to convert the clusters to regular expressions. Therefore the disclosure in relation to procedure 600 should be taken as exemplary only.

After the regular expressions have been generated, a determination is made, in step 520, whether there are any clashes among the generated regular expressions and any pre-existing regular expressions. An exemplary clashing regular expression is one in which a single transaction would match two or more regular expressions. Thus, the system would be unable to determine which of the plurality of regular expressions should be utilized. More generally, in accordance with illustrative embodiments of the present invention, any transaction should only match a single regular expression. Should a transaction match a plurality of regular expressions, the transaction management system may not be able to identify a unique vendor to associate with the transaction. That would complicate the operation of the transaction management server and could create corrupted data.

If there are clashed clashes, the procedure branches to step 525 where the clustering threshold is updated. As we appreciated by those skilled in the art, the clustering threshold level may be raised or lowered to fine tune the number of clusters generated. When using the Levenshtein Distance, the clustering value may be adjusted. In accordance with an illustrative embodiment of the present invention to similarity threshold may first be set to a value of 75-85 and may be dynamically adjusted by the system thereafter.

The procedure then branches back to step 515. If, in step 520, there are no clashes with the regular expressions, the procedure moves to step 530 where token uniqueness is evaluated. Tokens are described in more detail below in relation to FIG. 6. Token uniqueness may be evaluated both locally and globally. The evaluation of token uniqueness is an aid to determine the risk of false positives, i.e., the likelihood that a regular expression will match an input description that is not associated with the vendor with which the regular expression is set. This test may be performed by analyzing the number of static tokens in the regular expression as well as the uniqueness of each token.

A determination is made in step 535 whether the uniqueness of the tokens is acceptable. If the uniqueness is not acceptable, the procedure branches back to step 515. If the uniqueness is acceptable, the procedure continues to step 540 were the model is updated. Illustratively, the updating of the model may include, for example, updating the vendor map data structure to include the newly developed regular expressions, etc. More generally, updating the model associates the generated regular expression with a source identifier. In an illustrative embodiment, the source identifier is a vendor and the association is stored in the vendor map data structure. However, in alternative embodiments, the source identifier may identify an entity other than a vendor. As such, the description of associating a generated regular expression with a particular vendor should be taken as exemplary only. The procedure then completes in step 545.

Figure 6:
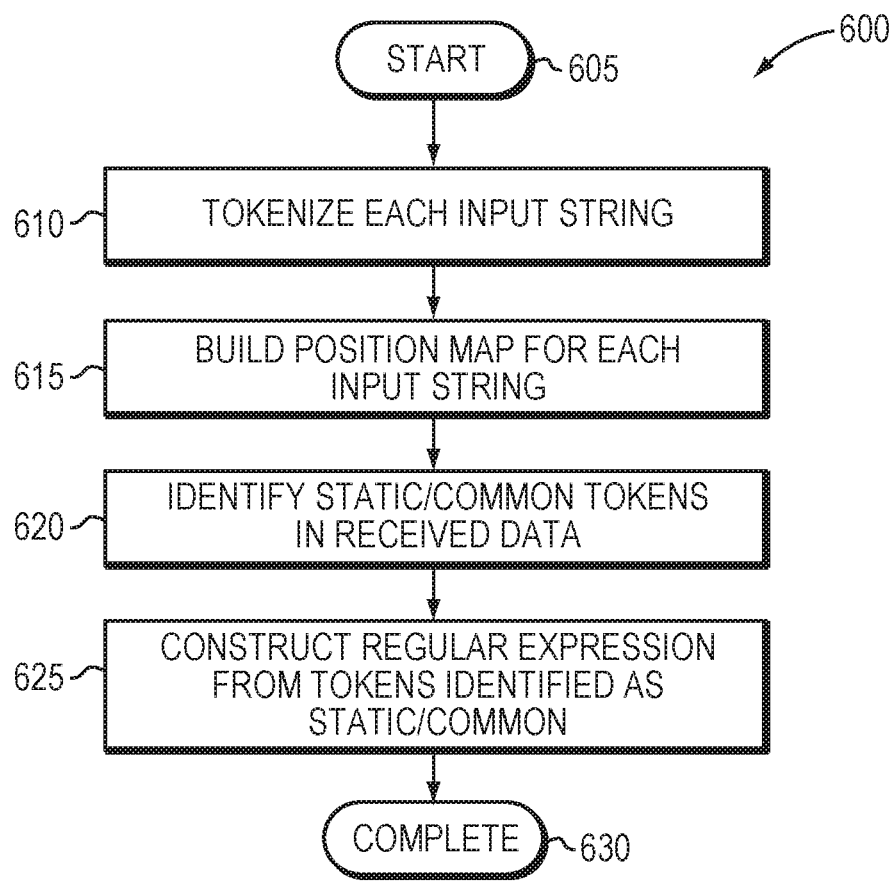
FIG. 6 is a flowchart detailing the steps of a procedure for converting clusters of transactions into regular expressions in accordance with an illustrative embodiment of the present invention.

FIG. 6 is a flowchart detailing the steps of the procedure for generating regular expressions in accordance with illustrative embodiment present invention. The procedure 600 begins in step 605 continues to step 610 where each input string is tokenized. We will use the four following exemplary transactions as the procedure 600 is described:

BEST BUY 00010454 SAN FRANCISCO CA
BEST BUY 00010909 BURBANK CA
BEST BUY 00014008 TEMECULA CA
BEST BUY 00023969 SAN JOSE CA

In operation, these would have been tagged (while part of the historical data that is input into the system) as being associated with the vendor "Best Buy".

Tokenization occurs by splitting each string into parts separated by whitespace characters. In accordance with alternative embodiments of the present invention, the strings may be split by use of other characters, e.g., underscores, etc. It should be noted that while the use of whitespace is described herein, the principles of the present invention may be utilized with other dividers, including embodiments where a plurality of dividers are utilized. As such, the description of the use of whitespace should be taken as exemplary only.

A position map is then generated for each input string in step 615. Each of the tokens is assigned a position based on its location within the string. For example, the first exemplary string:

BEST BUY 00010454 SAN FRANCISCO CA
would have a position map of:
BEST->1
BUY->2
00010454->3
SAN->4
FRANCISCO->5
CA->6

Static or common tokens are then identified in step 620. This may be accomplished by, e.g., for each token checking to see if it appears in every other string in the cluster. If the token does appear in every other string, then it is deemed to be a match. Using the sample data set, the token BEST would match every other string at position 1, while BUY would match every string at position 2. 0010454, SAN, and FRANCISCO would not match all other strings, so they would be discarded. Finally, the token CA would match all other strings. Some of these matches are at position 5 and others at position 6. It should be noted that the exact positions are not relevant, but instead the fact that the token matches each other string, even if in differing locations, is determinative of a token being retained or discarded.

In this example, the tokens BEST, BUY, and CA are found in each of the strings of data in the cluster. Therefore, these three tokens are deemed to be static/common for this cluster. One or more regular expressions are then generated from the identified static/common tokens in step 625. The regular expression is illustratively generated by concatenating all of the tokens that survived the matching with wildcard capture areas between them. In the example described herein, the regular expression would be:

(.*)BEST BUY(.*)CA(.*)

where (.*) is a wildcard identifier.

The procedure then completes in step 630. It should be noted that the procedure 600 described herein is an illustrative embodiment of a technique for generating regular expressions. It is expressly contemplated that alternative techniques may be utilized.

Figure 7:
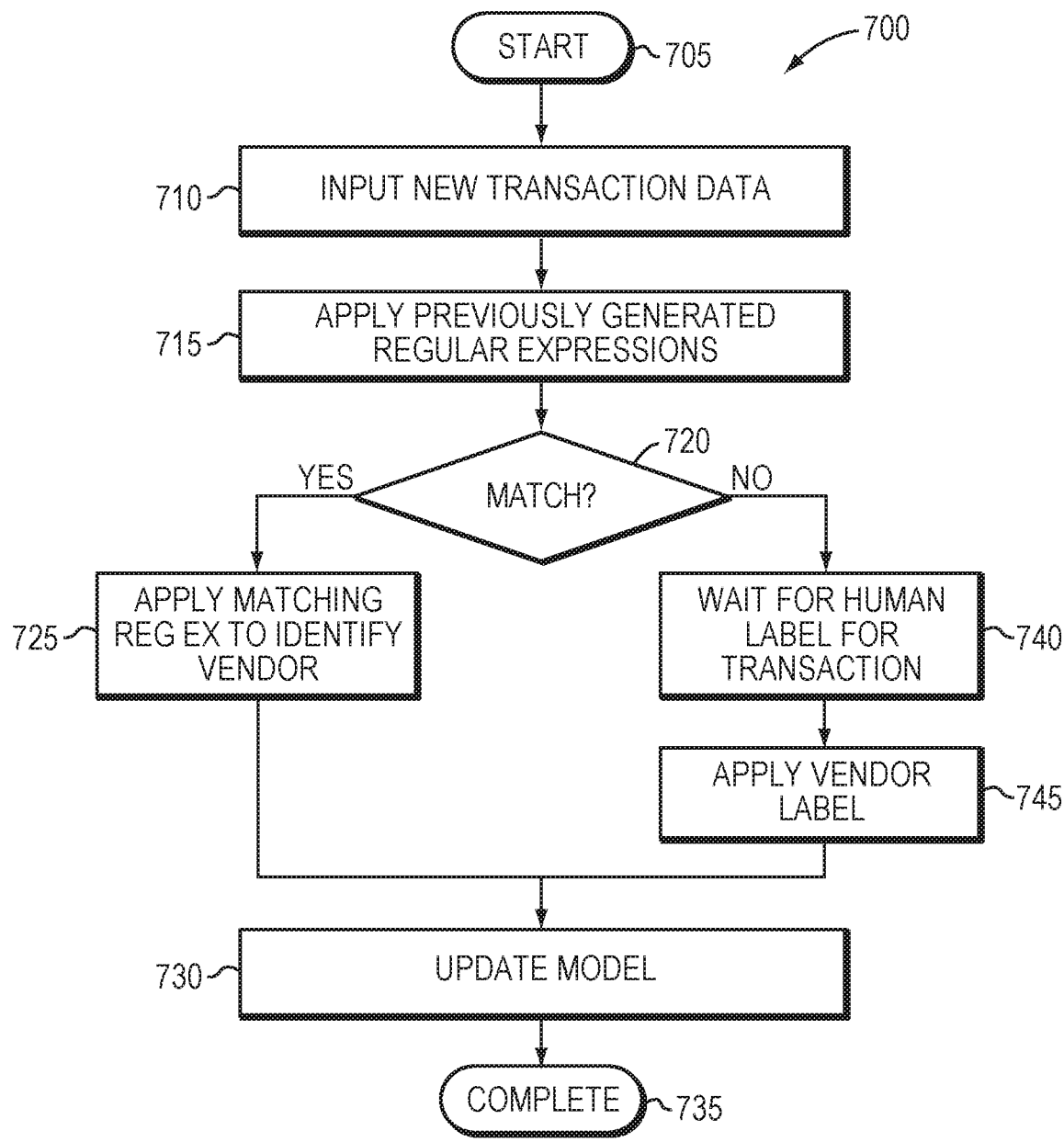
FIG. 7 is a flowchart detailing the steps of a procedure for vendor identification in accordance with an illustrative embodiment the present invention.

FIG. 7 is a flowchart detailing the steps of a procedure for processing an input transaction in accordance with illustrative embodiment of the present invention. The procedure begins in step 705 and continues to step 710 where new transaction data is entered. This new data may comprise a new batch of financial transactions received from a credit card company, etc. As noted above, various data providers may provide data in a substantially real time manner or may perform batch dumps of data. The procedure continues to step 715 where previously generated regular expressions are applied. That is, previously generated regular expressions that are stored in the vendor map data structure are applied to the transaction information associated with the new transaction data.

A determination is made whether any of the previously generated regular expressions match on the new transaction data in step 720. If there is a match, the procedure branches to step 725 to use the regular expression that matched to identify the vendor associated with the new transaction. The model is then updated in step 730 before completing in step 735. Updating the model illustratively comprises re-executing procedure 500 to determine if any refinements should be made to the regular expressions. In an illustrative embodiment, after every transaction is processed, the model is updated. However, in alternative embodiments, the model may be updated on a less frequent basis. As such, the description of updating the model after every transaction should be taken as exemplary only.

However, if in step 720 it is determined that no match occurs, the procedure then branches to step 740 to wait for a human to label the transaction. Once a human labels the transaction, the appropriate vendor label is applied in step 745 and the procedure continues to step 730.

Figure 8:
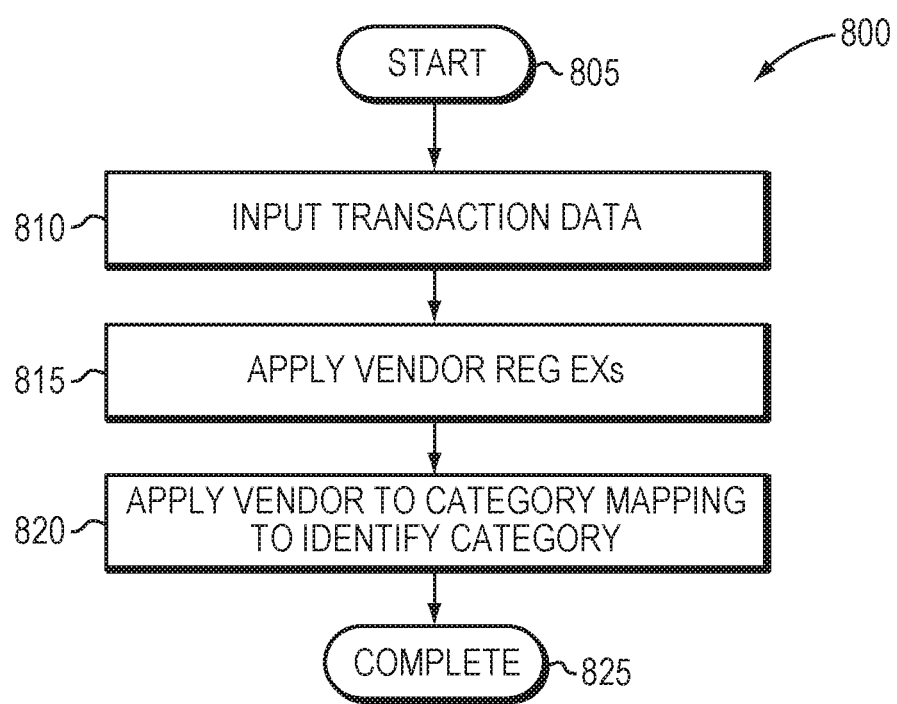
FIG. 8 is a flowchart detailing the steps of a procedure for assigning a category to a particular transaction in accordance with an illustrative embodiment of the present invention.

FIG. 8 is a flowchart detailing the steps of the procedure for processing a transaction in accordance with illustrative embodiment of the present invention. The procedure 800 begins in step 805 and continues to step 810 where transaction data is entered. Similar to procedure 700, the new data may represent batch inputted data or substantially real time data received. The normal data processing occurs, as described above in procedure 700, and the appropriate regular expression is applied to determine which vendor is associated with the particular transaction. Once the vendor is identified, vendor to category mapping information may be applied, in step 820, to associate a particular financial category with the received transaction. The procedure 800 then completes in step 825.

By automatically associating the input transaction with the vendor according to the one or more embodiments described herein, human intervention is not required to properly classify or label the input transaction. Advantageously throughput at the financial reporting system is increased. Therefore, the one or more embodiments described herein provide an improvement in the existing technological field associated with financial reporting systems since an input transaction received at the financial reporting system may be automatically and systematically associated with a vendor.

In addition, the one or more embodiments described herein have a practical application since financial reporting system may not have to rely on human intervention and the input transaction may be automatically and systematically associated with a vendor.

It should be noted that the description contained herein is exemplary and that it is expressly contemplated that alternative embodiments are possible. Therefore, examples, labels, titles, and structures described herein should be taken as exemplary. As will be appreciated by those skilled in the art, differing software constructs may be utilized to achieve the same functionality. Therefore, the description contained herein should be viewed as exemplary.

What is claimed is:

1. A method for transferring financial data from a first computer system to a second computer system, the method comprising the steps of:

receiving, by the second computer system from the first computer system over a network, a set of historical financial data;

generating one or more clusters of the historical financial data, wherein a number of the one or more clusters is generated utilizing a threshold value;

generating, for each cluster and by a processor of the second computer system, a regular expression;

determining, by the processor, if the regular expression clashes with a pre-existing regular expression stored in a vendor map data structure, wherein a clash indicates that the regular expression substantially matches the pre-existing regular expression, and wherein the pre-existing regular expression is mapped to a selected vendor in the vendor map data structure;

in response to determining that the regular expression clashes with the pre-existing regular expression, modifying the threshold value to generate a different number of clusters and generating the different number of clusters of the historical financial data utilizing the modified threshold value, by the processor, until the regular expression does not clash with the pre-existing regular expression;

in response to determining that the regular expressions does not clash with the pre-existing regular expression, storing, by the processor, the regular expression in a vendor map data structure in the second computer system, the vendor map data structure mapping the generated regular expression with a particular vendor;

receiving, by the second computer system, a new transaction data associated with the historical financial data; and identifying the particular vendor as being associated with the new transaction date based on a match of the new transaction data with the regular expression in the vendor map.

2. The method of claim 1 wherein processing throughput, at the second computer system to process and classify a plurality of different financial data, increases based on the identifying.

3. The method of claim 1 wherein generating one or more clusters comprises using a Levenshtein distance.

4. The method of claim 1 wherein the historical financial data comprises credit card transactions.

5. The method of claim 1 wherein generating, for each cluster, the regular expressions comprises:

tokenizing each of a plurality of strings of a particular cluster of the one or more clusters;

building a position map for each string of the plurality of strings;

identifying common tokens in the plurality of strings;

constructing the regular expression from the identified common tokens.

6. The method of claim 1 further comprising using the vendor map data structure to identify a category to be associated with the new transaction data.

7. A system comprising:

A computer having a processor, the processor executing a transaction management software, the transaction management software configured to:

receive, over a network, a set of historical data, the historical data having a plurality of historical data entries;

generating one or more clusters of the set of historical data utilizing a clustering threshold value, each of the one or more clusters having one or more of the plurality of historical data entries associated therewith;

convert each of the one or more clusters into one or more regular expressions;

determine if the one or more regular expressions clash with a pre-existing regular expression stored in a source map data structure, wherein a clash indicates that at least one of the one or more regular expressions substantially matches the pre-existing regular expression, and wherein the pre-existing regular expression is mapped to a selected source in the source map data structure;

in response to determining that the at least one of the one or more regular expressions clashes with the pre-existing regular expression, (1) modify the clustering threshold value to generating a different number of clusters and (2) generate the different number of clusters utilizing the modified clustering threshold until all of the one or more regular expressions do not clash with the pre-existing regular expression;

in response to determining that all of the one or more regular expressions do not clash with the pre-existing regular expression, associate each of the one or more regular expressions with a source identifier in the source map data structure.

8. The system of claim 7 wherein the historical data is historical financial transaction data.

9. The system of claim 7 wherein the one or more clusters are generated using a Levenshtein distance.

10. The system of claim 7 wherein the transaction management software is further configured to:

receive a new data entry;

apply the one or more regular expressions to the received new data entry;

determine whether a particular regular expression of the one or more regular expressions matches the received new data entry; and in response to determining that the particular regular expressions matches the received new data entry, associate the received new data entry with the source identifier that identifies a vendor and corresponds to the matched particular regular expression.

\* \* \* \* \*